United States Patent [19]

Jones

[11] Patent Number: 4,930,363

[45] Date of Patent: Jun. 5, 1990

[54] METHOD OF DETERMINING ATTRACTANT PREFERENCE OF FISH

[75] Inventor: Keith A. Jones, Spirit Lake, Iowa

[73] Assignee: Berkley, Inc., Spirit Lake, Iowa

[21] Appl. No.: 358,008

[22] Filed: May 26, 1989

[51] Int. Cl.$^5$ .............................................. G01B 1/00
[52] U.S. Cl. ................................................... 73/865.7
[58] Field of Search ........................................ 73/865.7

[56] References Cited

U.S. PATENT DOCUMENTS 4,693,897  9/1987  Johnsen et al. .

OTHER PUBLICATIONS

Takeda et al., "Identification of Feeding Stimulants for Juvenile Eel.", Bulletin of the Japanese Society of Scientific Fisheries, Jul. 1983.
Takii et al., "Effects of Supplement of Feeding Stimulants to Formulated Feeds on Feeding Activity and Growth of Juvenile Eel", Bulletin of the Japanese Society of Scientific Fisheries, Oct. 1983.
Mackie, et al., "Chemical Nature of Feeding Stimulants for the Juvenile Dover Sole," J. Fish Biol., vol., 16, pp. 701–708 (1980).
Mackie, et al., "Further Studies on the Chemical Control of Feeding Behavior in the Dover Sole," Comp. Biochem. Physical., vol. 73A pp. 89–93 (1982).
Takeda, et al., "Identification of Feeding Stimulants for Formulated Feeds on Feeding Activity & Growth of Juvenile Eel.," Bull Japan Soc. Sci., Fish., vol. 50, pp. 1039–1043 (1984).
Adams, et al., "A Solid Matrix Broassay for Determining Chemical Feeding Stimulants", Prvg. Fish-Cuit., vol. 48, pp. 147–149 (1986).
Hidaka, et al., "Taste Receptor Stimulation & Feeding Behavior in the Puffer, I. Effect of Single Chemicals," Chemical Senses Flav., vol. 3, pp. 341–354 (1978).
Ohsugi, et al., "Taste Receptor Stimulation & Feeding Behavior in the Puffer, II. Effects Produced by Mixtures of Constituents of Clam Extracts," Chem. Senses Flav. vol. 3, pp. 335–368 (1978).
Hidaka, "Taste Stimulation & Feeding Behavior in the Puffer," Chemoreception in Fishes, Elsevier Publ., N.Y., pp. 243–257 (1982).
Adron, et al., "Studies on the Chemical Nature of feeding Stimulants for Rainbow Trout," J. Fish Biol., vol. 12, pp. 303–310 (1978).
Mackie, et al., "Identification of Inosine & Inosine 5'-Monophosphate as the Gustatory Feeding Stimulants for the Turbot," Comp. Biochem. Physiol., vol. 60A, pp. 79–83 (1978).
Mackie, et al., "Studies on the Chemical Nature of Feeding Stimulants for the Juvenile Europ. Eel." J. Fish Biol., vol. 22, pp. 425–430 (1983).
Gok, et al., "Effect of Amino Acids on the Feeding Behavior in Red Sea Bream," Comp. Biochem. Physiol., vol. 66C, pp. 225–229 (1980).

*Primary Examiner*—Robert Raevis
*Attorney, Agent, or Firm*—Faegre & Benson

[57] ABSTRACT

A method of determining the preference of fish to specific materials as attractants or stimulants or determining the palatability of a stimulant to a fish species, particularly trout. The method exposes fish to a chemical inert, fibrous material, digestible by the fish species, such as cellulose pellets, (cotton), containing compounds or materials believed to be potential attractants and measuring the time interval in which the fish species retains or swallows the cellulose pellet. The materials found to be preferred by the fish species may then be included in bait or lures or foodstuffs for such fish species.

11 Claims, 3 Drawing Sheets

METHOD OF DETERMINING ATTRACTANT PREFERENCE OF FISH

BACKGROUND OF THE INVENTION

1. Field of the Invention

This invention is concerned with methods of determining the palatability, or attractant preference, of chemical substances to fish, specifically one which can be used to screen potential chemical stimulants or attractants to be added to commercial fish baits and foodstuffs for the purpose of enhancing the palatability, acceptability, and potency of these products. In particular the method relates to exposing fish to cellulose pellets containing compounds believed to be attractants and measuring the time interval in which the fish species retains or swallows the cellulose pellet.

2. Description of Related Art

Like mammals, probably all fish use their sense of taste to assess the palatability of objects taken into their mouths. In fact, fish will readily eject objects which are neutral or offensive in taste from their mouths in a matter of seconds, whereas those which are palatable are retained, chewed, and perhaps even swallowed. In the past, numerous researchers have utilized this behavior to screen various chemical stimulants, both of a complex (e.g. the flesh of living prey) and pure (e.g. amino acids obtained from a commercial chemical supplier) nature, as potential additives for enhancing commercial fish baits and foodstuffs. In these studies palatability has been measured by comparing the feeding intensity of a target species to a plain bland basal diet versus that to the same diet flavored with the test substance(s) of interest. Thus Hidaka et al. "Taste Receptor Stimulation and Feeding Behavior in the Puffer, Fugu Pardalis I. Effect of Single Chemicals" Chem. Senses Flav., vol. 3, pp. 341-354 (1978), Ohsugi et al. "Taste Receptor Stimulation and Feeding Behavior in the Puffer, Fugu Pardalis. II. Effects Produced by Mixtures of Constituents of Clam Extracts" Chem. Senses Flav., vol. 3, pp. 355-368, (1978), and Hidaka, "Taste Stimulation and Feeding Behavior in the Puffer" Chemoreception in Fishes, Elsevier Publisher, N.Y. pp. 243-257, (1982) scored the response intensity of puffers (*Fugu pardalis*) to pellets of plain and flavored wheat starch on an arbitrary scale of 0-4. Using a mixture of casein, vitamins, and minerals as the basal diet, Adron and Mackie "Studies on the Chemical Nature of Feeding Stimulants for Rainbow Trout, Salmo Gairdneri" J. Fish Biol., vol. 12, pp. 303-310 (1978) determined the relative acceptability of flavored versus non-flavored diets to rainbow trout (*Salmo gairdneri*) by counting the number of times the fish actuated a self-feeder offering a fixed number of food pellets with each actuation. Likewise, Mackie and Adron "Identification of Inosine and Inosine 5'-Monophosphate as the Gustatory Feeding Stimulants for the Turbot, Scophthalmus Maximus" Comp. Biochem. Physiol., vol. 60A, pp. 79-83 (1978) measured the percentage of food pellets proffered which were actually eaten by the turbot (*Scophthalmus maximus*), whereas Mackie et al. "Chemical Nature of Feeding Stimulants for the Juvenile Dover Sole, Solea Solea (L.)" J. Fish Biol., vol. 16, pp. (1980) and Mackie and Mitchell "Further Studies on the Chemical Control of Feeding Behavior in the Dover Sole, Solea Solea" Comp. Biochem. Physiol., vol. 73A, pp. 89-93 (1982) and "Studies on the Chemical Nature of Feeding Stimulants for the Juvenile European Eel, Anguilla Anguilla (L.)" J. Fish Biol., vol. 22, pp. 425-430 (1983), measured the amount of flavored and non-flavored diet eaten before feeding cessation by the Dover sole (*Solea solea*) and the European eel (*Anguilla anguilla*), respectively. Using a similar casein-based diet, Goh and Tamura "Effect of Amino Acids on the Feeding Behavior in Red Sea Bream" Comp. Biochem. Physiol., vol. 66C, pp. 225-229 (1980), Takeda et al, "Identification of Feeding Stimulants for Juvenile Eel" Bull. Jap. Soc. Sci. Fish., vol. 50, pp. 645-651, (1984), and Takii et al, "Effects of Supplement of Feeding Stimulants to Formulated Feeds on Feeding Activity and growth of Juvenile Eel" Bull. Jap. Soc. Sci. Fish., vol. 50, pp.1039-1043 (1984), offered the red sea bream (*Chrysophrys major*) or the Japanese eel (*Anguilla japonica*) a choice between two food balls (one flavored and one not) presented together to determine whether the flavored diet was preferred. In a similar bioassay, Adams and Johnsen, "A Solid Matrix Bioassay for Determining Chemical Feeding Stimulants", Prog. Fish-Cult., vol. 48, pp. 147-149 (1986) and Johnsen and Adams U.S. Pat. No. 4,693,897 issued Sept. 15, 1987, offered *Tilapia zillii* a choice between two agar disks, one experimental and one reference, to establish their preference. The patent makes reference to several articles dealing with chemosensory reception or rejection by various fish.

As some of these researchers themselves admit, these methodologies have several drawbacks. The basal diet may have a taste of its own and thereby influence the experimental subject's perception of the test substance. Also, in multiple choice tests, whether a fish begins to feed on the flavored or non-flavored diet is largely a matter of which one is contacted first. Moreover, because the diet is filling and its consumption gradually lowers the subject's motivation to feed during repeated trials, the variability within these behavioral assays is undesirably high, diminishing their sensitivities. Most importantly, however, the preparation of the diets and the lengthy observations on the behavioral responses are rather labor-intensive and time-consuming. Hence, the methods themselves are sufficiently tedious to inhibit investigators from undertaking the exhaustive type of studies needed to better understand taste perception in fish and to apply this knowledge in the enhancement of commercial fish baits and feeds.

SUMMARY OF THE INVENTION

An improved method for testing palatability in fishes has been developed which takes advantage of the fact that many (and perhaps most) species are sight-feeders. The method entails soaking, or otherwise incorporating on or in, commercially-available cotton dental pellets, or any other chemically inert and digestible, fibrous material, in solutions of substances to be tested, presenting those pellets to one or more members of a species which will attack the pellets on sight, and measuring with a stopwatch the number of seconds each Pellet is retained within the mouth before finally being ejected by the experimental subject. The method is superior to the above described methods because it resolves the experimental questions: "How palatable does the fish perceive this chemical substance to be?" down to its simplest form, because it requires no preparation of a diet, because the vehicle carrying the test substance(s) is only minimally filling, and because the test can be applied easily and frequently to any number of fish held individually or in groups within separate test units (e.g.

small aquaria). Thus, the method is quite sensitive, highly reproducible, and permits the rapid accumulation of quantitative data on the taste perceptions of sight-feeding fish. The results can then be directly applied to identifying potential chemical additives for enhancing the potency of commercial fish baits and feeds.

The primary object of this invention is accordingly to provide a rapid, reproducible, and sensitive quantitative behavioral method for determining the palatability of a wide assortment of chemical substances, whether natural or synthetic, complex or simple, presented singly or in combination, to a wide variety of different species for the purpose of identifying substances which could be potentially added to commercial fish baits and foodstuffs to enhance their palatability, and thereby potency.

The method of this invention accordingly comprises the steps of (a) providing a feeding vehicle or substrate of a chemically inert, digestible, fibrous material, such as a cellulose pellet into which a material of interest as a potential attractant or stimulant may be incorporated; (b) incorporating or applying to said vehicle or substrate said material of interest as a stimulant or attractant; (c) exposing the fish species capable of discriminating between blank Pellets and pellets containing a natural feeding stimulant to cellulose pellets containing the material of interest and (d) measuring the time intervals length of time in seconds the cellulose pellet containing the material of interest was retained by a member of the fish-species.

The materials of interest which are shown to be attractants or stimulants by the foregoing test are then incorporated in baits or in foodstuffs for the particular fish species attracted thereto.

DETAILED DESCRIPTION OF THE INVENTION

Figure 1:
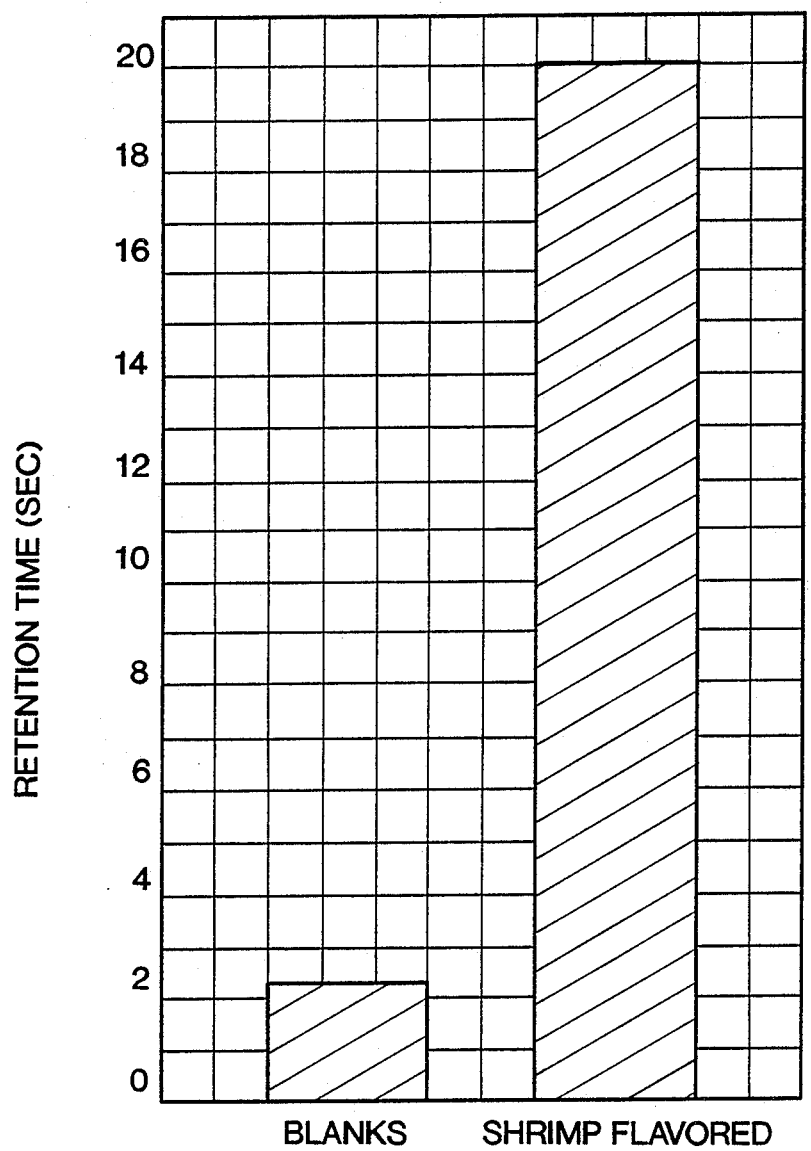
FIG. 1 is a graph representation showing the response of trout between blank cellulose pellets and pellets flavored with a natural feeding stimulant (shrimp extract flavored).

In this detailed discussion and Examples of the method of the invention briefly summarized above, the rainbow trout species is the species evaluated. Other fish species may be evaluated in the same manner.

It is generally accepted that the vast majority of fishes locate their food by sight. Even in many of those species which rely heavily on other senses, e.g. hearing and smell, to draw within the general vicinity of the food source, the final attack is often directed by vision.

As a species which inhabits clear freshwater streams and lakes, and which possesses a well-developed eye, the rainbow trout (*Salmo gairdneri*) can certainly be labelled as a sight-feeder. It also has a sense of taste at least as well-developed as that of most species of fish. Accordingly, results from studies on rainbow trout are used to demonstrate the invention. Nevertheless, it should be emphasized that virtually any sight-feeder is amenable to the test procedure described below. Other species which have been tried with the new method and proved successful are the largemouth bass (*Micropterus salmoides*), bluegill (*Lepomis macrochirus*), black crappie (*Pomoxis nigromaculatus*), walleye (*Stizostedion vitreum vitreum*), perch (*Perca flavescens*), brown trout (*Salmo trutta*), and musky (*Esox masquinonuy*).

EXAMPLE 1

A total of 110 rainbow trout, ranging in length from 16–23 cm, were used. The trout were tested in two banks of aquaria (six 110 liter aquaria in a 2×3 matrix and twelve 55-1 aquaria in a 3×4 matrix) supplied with non-recirculating water (6°–8° C.; pH 8.00; total hardness—0.23 mmol/l $CaCo_3$) The size of the test tanks is unimportant, providing that the experimental subjects are comfortable. Here the fish were tested in groups of either three (55-1 aquaria) or six (110-1 aquaria), but subsequent tests have shown that a single fish per aquarium yields better results because there are no social interactions to distract the trout.

In all cases the test procedures consisted of dropping into each tank a series of cotton pellets soaked in either deionized water or an aqueous solution of a test substance. Trout are strong visual feeders and will readily attack all such pellets on sight. However, unflavored cotton pellets or pellets flavored with neutral or distasteful substances are quickly spat out. In contrast, those with palatable substances are chewed and retained in the mouth for a length of time directly related to the palatability of the test solution. Highly palatable substances are often even swallowed. By measuring with a stopwatch the length of time each pellet was retained by the trout, a relative but quantitative measure of the palatability of each test substance was obtained. Those that were swallowed received the arbitrary maximum time allowed—20 sec. Each group of trout received three trials, or presentations, in the morning (09.00–10.00 hours C.S.T.) and three more in the afternoon (15.00–16.00 hours C.S.T.), but subsequent tests have shown that the number of trials in each session can be easily doubled with no ill effects on the fish.

In all cases the preferred vehicle for the test substances was cotton which can be easily swallowed and readily passes through the digestive tract with no harm. However, any chemically inert, fibrous material, whether natural or synthetic, which has the appropriate texture to allow the experimental subject to chew and swallow, which is essentially non-filling, and which readily passes through the digestive system with no harm to the experimental subject would be acceptable and encompassed within the present invention. The preferred shape and size of the cotton pellets for trout of this size are 6 mm spheres. However, any shape having as its largest dimension a size which falls within a rough range of 2–20 mm is likely to be acceptable for this size trout. Smaller and larger trout may require different sizes accordingly.

The results displayed in FIG. 1 demonstrate that rainbow trout will clearly discriminate between non-flavored cotton pellets and those flavored with a highly palatable substance. In this case the latter is an extract of a common crustacean, shrimp. The extract was prepared daily for the tests by stirring 5 g of lyophilized, powdered shrimp into 100 ml of water. In FIG. 1 the trout (N-33) presented with cotton pellets soaked in plain deionized water (blanks) retained these pellets in their mouths for an average of only 2.3 sec. In sharp contrast, the pellets flavored with the shrimp extract were without exception always held beyond the 20 sec. maximum or, more often, swallowed (mean=20; N=15). A one-way analysis of variance (ANOVA) performed on the data showed that the difference between the two means—blanks vs. shrimp flavor—was highly significant statistically (P<0.01).

Chemically complex substances, such as an aqueous extract of flesh from a prey organism, usually have such a broad appeal as to fulfill the taste requirements of most carnivorous fish. Aqueous solutions of pure compounds, e.g. synthetic amino acids obtained from a commercial chemical supplier, typically have far less appeal and, consequently, are more difficult to assess in a behavioral experiment. Nonetheless, there is considerably more scope for progress in increasing the potency of fish baits and foodstuffs if the actual organic compounds on which a particular species relies to chemically detect the presence of food are known. Not only can the concentration of these chemicals in natural baits and foodstuffs be increased beyond their normal levels by adding extra amounts of the specifically identified palatable compounds, other unnecessary compounds which might serve to dilute or oppose the beneficial effects of the active agents can be left out. Thus, it is helpful if the behavioral responses by fish to solutions of pure, simple compounds can be quantified.

EXAMPLE 2

Figure 2:
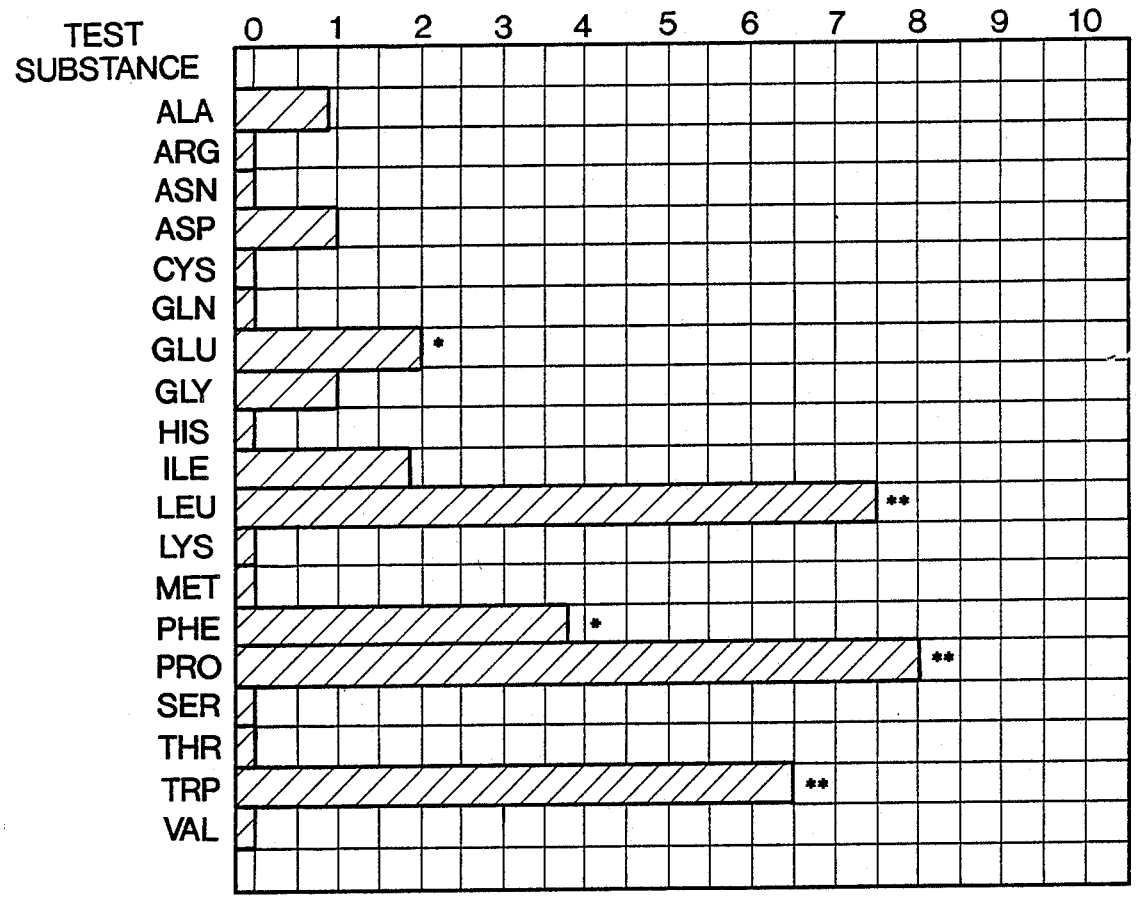
FIG. 2 is a bar graph representation showing retention time, by trout in seconds in excess of blanks of various amino acid materials.

FIG. 2 displays the response of rainbow trout to the 20 amino acids most common to biological systems. The authentic compounds (L-form) were all obtained from a commercial chemical supplier (Sigma Chemical, St. Louis). The 20 amino acids tested with the improved method of the present invention were: alanine (Ala); Arginine (Arg); Asparagine (Asn); Aspartic acid (Asp); Cysteine (Cys); Glutamine (Gln); Glutamic Acid (Glu); Glycine (Gly); Histidine (His); Isoleucine (Ile); Leucine (Leu); Lysine (Lys); Methionine (Met); Phenylalanine (Phe); Proline (Pro); Serine (Ser); Threonine (Thr); Tryptophan (Trp) and Valine (Val). Each amino acid was mixed to a concentration of $10^{-2}$M in deionized water. Cotton pellets were soaked in each solution and then presented to at least six different groups of trout within the 18 test aquaria. The order of presentation was randomized among the 20 solutions to avoid ordering effects. The retention times for each of the 20 amino acids shown in FIG. 2 are those in excess of the average retention time. Those statistically (one-way ANOVA) greater than the mean retention time for the blanks are indicated with one (P<0.05) or two (P<0.01) asterisks. The study demonstrated that of the 20 amino acids only glutamic acid (Glu), leucine (Leu), phenylalanine (Phe), proline (Pro), and tryptophan (Trp) at $10^{-2}$M were perceived by the trout to be palatable, as determined by their significantly longer retention times. Thus, the results demonstrate the method to be sufficiently sensitive to illuminate differences between even solutions having weak taste perceptions. Moreover, repeated trials on the amino acids have yielded the same results, emphasizing the method's reproducibility.

EXAMPLE 3

Figure 3:
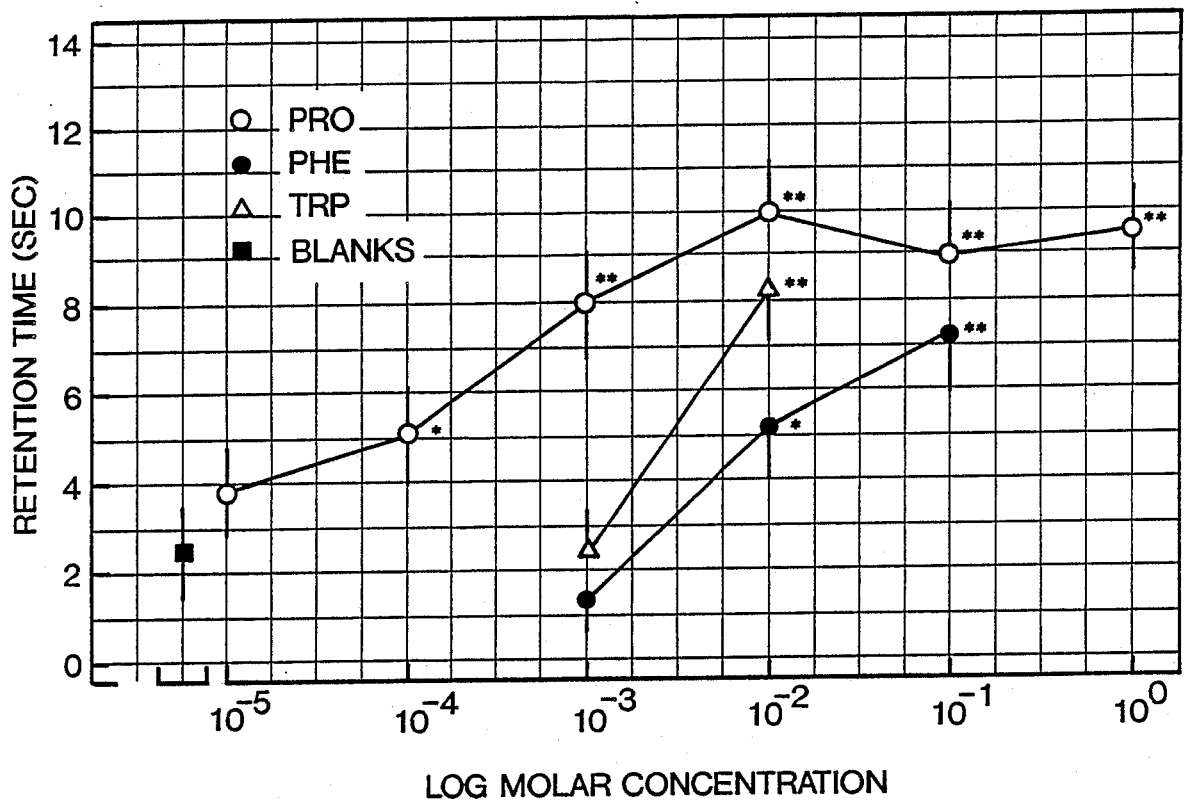
FIG. 3 is a graph representation of results of the method of the invention showing concentration-response relationship for blank pellets and those having incorporated therewith the amino acid, proline, phenylalanine and tryptophan.

As a further demonstration of the method's sensitivity, three of the palatable amino acids (proline, phenylalanine, and tryptophan) were tested at additional concentrations (FIG. 3). All three compounds belong to the same class of amino acids (non-polar amino acids) and structurally all three consist of one or more aromatic rings. Hence, there is considerably less difference between these three amino acids than there is between amino acids belonging to different classes. Nevertheless, as the method reveals, rainbow trout readily distinguish between the three compounds. Proline consistently evoked the highest retention times throughout its concentration-response curve and had the lowest threshold concentration (that concentration at which the response can no longer be discerned from the response to blanks). Tryptophan evoked the next highest response, followed by phenylalanine. This clearly illustrates the method can not only be used to screen a large number of compounds for their palatability, but it can also be used to determine the relative preference amount those substances deemed palatable.

What is claimed is:

1. A method for determining palatability of a stimulant or attractant to a fish species comprising the steps of:
   (a) providing a feeding substrate of a chemically inert, fibrous material, digestible by said fish species;
   (b) applying to said substrate a material of interest as a potential attractant or stimulant to said fish species;
   (c) exposing a member of said fish species to said substrate containing said material of interest; and
   (d) measuring the length of time in seconds said substrate containing said material of interest is retained by said member of said fish species.

2. A method as defined in claim 1 wherein said fish species is rainbow trout.

3. A method as defined in claim 1 wherein said substrate is a cellulose pellet.

4. A method as defined in claim 3 wherein said material of interest is applied to said cellulose pellet by soaking said pellet in an aqueous solution containing said material of interest.

5. A method as defined in claim 4 wherein said aqueous solution containing said material of interest has a concentration in the range of $100^0$ to $10^{-4}$ molar concentration in deionized water.

6. A method as defined in claim 4 wherein said aqueous solution containing said material, of interest has a concentration lower than $10^0$ molar concentration in deionized water.

7. A method as defined in claim 6 wherein said pellet is a cotton pellet.

8. A method as defined in claim 6 wherein said material of interest is incorporated into said pellet at a concentration in the range of $100^0$ to $10^{-4}$ molar concentration in deionized water.

9. A method as defined in claim 6 wherein said fish species is rainbow trout.

10. A method of determining the preference of a fish species to a stimulant or attractant comprising the steps of:
    (a) providing a cellulose pellet;
    (b) soaking said cellulose pellet with an aqueous solution of a material of interest as a potential attractant;
    (c) exposing a member of said fish species, capable of discriminating between blank pellets and pellets containing a natural feeding stimulant, to said cellulose pellet containing said material of interest; and
    (d) measuring the length of time in seconds the cellulose pellet containing said material of interest was retained by said member of said fish species.

11. A method as defined in claim 10 wherein said pellet is a pellet about 6 mm in size.

* * * * *

UNITED STATES PATENT AND TRADEMARK OFFICE
CERTIFICATE OF CORRECTION

PATENT NO. : 4,930,363

DATED : June 5, 1990

INVENTOR(S) : Keith A. Jones

It is certified that error appears in the above-identified patent and that said Letters Patent is hereby corrected as shown below:

COLUMN 6

In claim 5, line 3, "100°" should read --10°--.

In claim 8, line 3, "100°" should read --10°--.

Signed and Sealed this

Eighteenth Day of February, 1992

Attest:

HARRY F. MANBECK, JR.

Attesting Officer

Commissioner of Patents and Trademarks